Sept. 25, 1951 F. C. WALLACE 2,569,392
SHEET METAL CLAMP
Filed Jan. 31, 1948
FIG. 1.
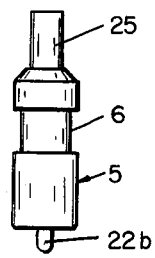
FIG. 2.
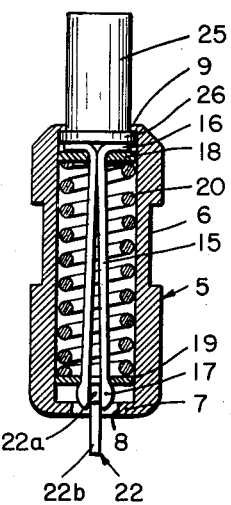
FIG. 3.
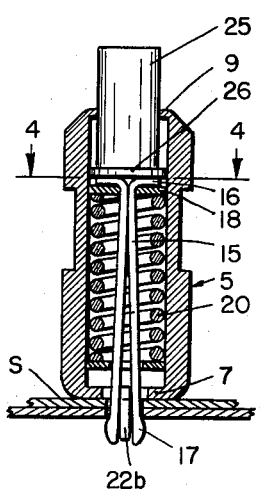
FIG. 4.
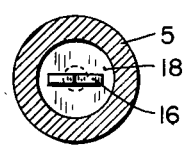
FIG. 5.
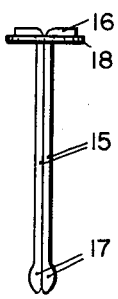
FIG. 6. FIG. 7. FIG. 8.
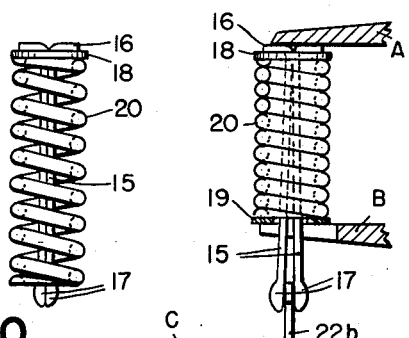
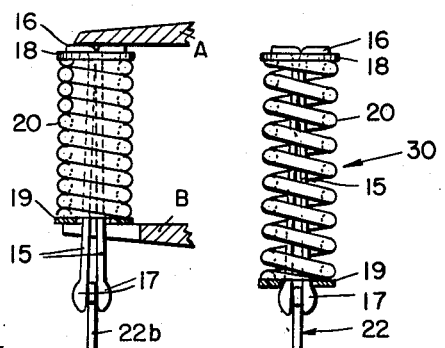
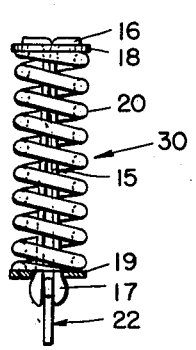
FIG. 9.
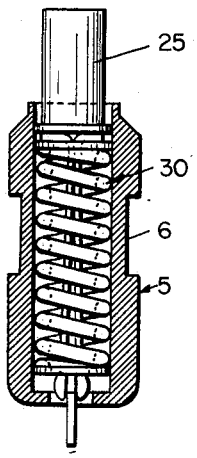
FIG. 10.
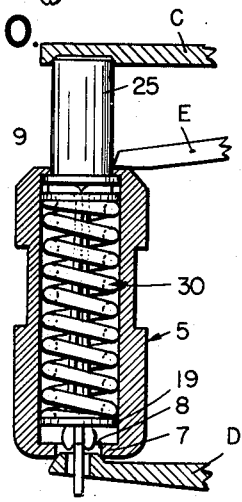
FIG. 11.
INVENTOR
FRANK C. WALLACE
BY
ATTORNEYS Patented Sept. 25, 1951

2,569,392

UNITED STATES PATENT OFFICE 2,569,392

SHEET METAL CLAMP

Frank C. Wallace, North Hollywood, Calif., assignor, by mesne assignments, to Herman H. Helbush Application January 31, 1948, Serial No. 5,596

2 Claims. (Cl. 85—6)

My invention has to do with sheet metal clamps of the type wherein a pair of spring-loaded laterally spreadable clamping pins are mounted in a cylindrical body for reciprocal movement through an opening in the end thereof past a stationary spreader mounted between the pins. Such clamps operate to engage and clamp work sheets between enlarged outer ends of the pins and the outer end of the body. My invention also has to do with methods of making such clamps.

While clamps of this general type are well-known in the art, difficulties have been experienced in assembling them, which difficulties have increased the cost thereof, and since in sheet metal work such as airplane construction such clamps are used by the thousands, any improvement which is conducive to reducing the cost thereof is of considerable importance. The assembly difficulties have arisen because of the fact that the interior construction requires assembly work which can only be done efficiently upon a jig and since, for safety purposes, it has heretofore been considered essential that the hole in the outer end of the body be small enough to prevent the enlarged ends of the clamping pins from being retracted into the body by the spring when the spreader is between them, difficulties have been experienced in first making the sub-assembly of the interior parts and subsequently mounting them in the body.

Another shortcoming of prior art clamps is that they have been of such construction that the enlarged outer ends of the clamping pins project below the outer end of the body even when not being used to clamp work sheets, which exposes them to injury.

It is, therefore, an object of my present invention to overcome those difficulties by providing a modified body construction and a new method of manufacture.

More particularly I have found that those difficulties may be completely overcome by utilizing a cylindrical clamp body with an integral outer end wall having a pin-passing opening large enough to permit the enlarged ends of the pins to be fully retracted into the body while the spreader is between them, the internal assembly being then prevented from escaping from the opposite end of the body under the influence of the spring load by virtue of a peripheral flange on the plunger portion of the internal assembly abutting an internal flange on the body. This permits all the internal parts to be set up in a sub-assembly outside the body and then inserted in the body through the inner end thereof, after which it is necessary only to peen the body flange into position to provide an abutment for the plunger flange.

Still further objects and advantages of my present invention will be apparent from the following description of a presently preferred embodiment thereof, for which purpose I shall refer to the accompanying drawings, in which:

Fig. 1 is a side elevation;

Fig. 2 is a medial longitudinal section with the plunger element shown in elevation and with the clamp in fully retracted position;

Fig. 3 is a view similar to Fig. 2 but showing the clamp in work-clamping position;

Fig. 4 is a section taken on line 4—4 of Fig. 3;

Figs. 5, 6, 7, 8, 9 and 10 are side elevational views showing the various steps of assembly, the body being shown in section in Figs. 9 and 10; and Fig. 11 is an enlarged perspective view of the spreader bar.

Referring now to the drawings, the numeral 5 designates a cylindrical body which has an annular recess 6 for the reception of an operating tool, not shown, the outer end wall 7 presenting an axial hole 8. There is an internal flange 9 at its opposite or inner end of the body.

The internal assembly consists of a pair of resilient laterally flexible clamping pins 15 having right angularly bent inner ends 16 and lateral projections or enlargements 17 on their outer ends. The inner ends of the clamping pins are held together by a washer 18 and around the outer end portion of the pins there is another washer 19. A compression spring 20 is held partially compressed between the washers 18 and 19.

A T-shaped spreader bar 22 (Fig. 11) having a cross portion 22a and a central outwardly extending leg 22b, has its cross portion 22a interposed between the outer ends of the clamping pins outwardly beyond the washer 19 while the central leg 22b projects outwardly between the pins to a point beyond the outer ends of said pins and through the opening in the body end wall.

The cross portion 22a of the spreader bar is longer than the diameter of the hole 8 so that it cannot pass outwardly through said hole, and it is also longer than the diameter of the hole in washer 19 so that it cannot pass upwardly through that hole. The combined thickness of the enlarged outer ends of the clamping pins and the spreader bar between them is greater than the diameter of the hole in washer 19 so that the outer ends of the pins cannot pass upwardly through the washer 19 when the spreader is between them. Consequently the spring is confined between washers 18 and 19 and the pins are confined against upward or rearward escape from the washers by engagement of the enlarged outer ends of the pins against washer 19.

To actuate the clamping pins to project their outer ends through the hole 8 I provide a plunger 25 having a peripheral flange 26 on its inner end. This flange provides an upwardly facing shoulder which, when the clamp is not in use—that is, when it is in the fully retracted position of Fig. 2—abuts against the inwardly disposed flange 9 formed by peening over the upper or inner end of the body. Thus, if for any reason the enlarged outer ends of the clamping pins should, by virtue of breakage or otherwise, accidentally escape upwardly through the hole in washer 19, the parts could not escape through the inner end of the body because of the abutment of flange 26 with flange 9.

By virtue of the foregoing described construction it is possible and practical to form a sub-assembly of the parts 15, 18, 19, 20 and 22 exteriorly of the body and then to insert the entire sub-assembly as a unit into the body through the top or inner end thereof by the following procedure:

First, the clamping pins are inserted, one at a time, through the washer 18 after their ends have been bent at right angles (Fig. 5). The spring 20 is next mounted around the pins and against washer 18 (Fig. 6). Next, the washer 19 is inserted over the outer ends of the pins and against the spring, after which the assembly is placed between jig elements A and B and the jig is operated to compress the spring 20 as shown in Fig. 7, after which the spreader bar 22 is inserted between the outer ends of the pins. The assembly is then released from the jig and the parts assume the position illustrated in Fig. 8, in which condition the entire sub-assembly, generally denoted by the numeral 30, is ready to be inserted as a unit in the top or inner end of the body 5 as shown in Fig. 9. The plunger 25 is then inserted and finally the body is placed between the jig elements C and D, the plunger is forced slightly inwardly by the jig element C and a peening tool E is operated to peen over the top or inner end of the body to form an inwardly disposed flange 9.

In the handling of sheet metal clamps it is common for workmen to use the clamping pins for purposes other than their intended purposes and to subject them to considerable abuse which tends to bend and distort the projecting clamping pins so that the clamps become unusable. I overcome this and also make possible the above described method of assembly by virtue of the fact that I make the hole 8 in the body end wall large enough to permit the enlarged ends of the pins to be fully retracted into the body when the clamp is not in use, so that the pins are protected and concealed.

In operation, the clamp, when in the positions of Figs. 1 and 2, is placed in a clamp-operating tool which has a portion engaging in the recess 6 and a movable jaw to press the plunger 25 inwardly. This tool is then used to project the clamping pins outwardly through the hole 8 until the enlarged ends 17 are spaced beyond the outer end of the central leg 22 of the spreader bar. This permits the outer ends of the clamping pins to be pressed together by their engagement with the side walls of registering holes in work sheets S so that they may be inserted through the holes ahead of the leg 22b of the spreader. The leg 22b of the spreader is then inserted in the holes, with the bottom end of the body resting against the top work sheet S. Upon release of the operating tool the spring 20 thus retracts the clamping pins relative to the spreader until the enlarged ends 17 engage the bottom work sheet around the hole therein, thus clamping the work sheets between the ends 17 and the end of the body (Fig. 3). To release the clamp the operating tool is again used to project the pins outwardly of the body until the enlarged ends 17 are far enough beyond the outer end of the spreader bar to permit the pins to be withdrawn from the registering holes in the work sheets.

I claim:

1. The method of making sheet metal clamps from a collection of parts including a pair of flexible clamping pins each having a lateral projection at each end, a pair of washers, a compression spring, a T-shaped spreader and a peripherally flanged plunger, which method comprises forming a sub-assembly of the pins, washers, spring and spreader by inserting the pins in one of the washers, applying the spring around the pins with its inner end abutting said washer, applying the other washer around the pins and against the outer end of the spring, partially compressing the spring and inserting the spreader between the outer ends of the pins below the last applied washer so that the cross portion of the spreader projects laterally from between the pins, providing a cylindrical body having an end wall presenting an axial opening of a diameter greater than the combined thickness of the spreader and the outer ends of the pins with their lateral projections and then inserting said sub-assembly axially, outer end first, into the body through the inner end thereof, inserting the plunger through the inner end of the body into engagement with the inner ends of the pins and peening the inner end of the body inwardly sufficiently to overhang the flange on the plunger.

2. A sheet metal clamp comprising a tubular body having an outer end closure with an axial opening therethrough and having an inwardly-facing shoulder at its inner end, a pair of flexible clamping legs mounted in the body for protraction and retraction through said opening, said legs having enlarged outer ends, a spring in the body urging the legs axially inwardly thereof, an operating plunger mounted in and projecting from the inner end of the body, said plunger having a flanged inner end disposed for engagement with the first-named shoulder, a rigid spreader member disposed between the outer end portions of said legs and held against said outer end closure by said spring and having a central portion projecting outwardly from the body through said opening, and means at the inner end portions of said legs urging them towards each other and against opposite faces of said spreader member; said opening being at least as large in diameter as the combined thickness of the enlarged outer end portions of said legs plus the thickness of said spreader member and said legs being of such length in relation to the length of the body that, when retracted, their said enlarged outer ends are disposed substantially in said opening.

FRANK C. WALLACE.

REFERENCES CITED

The following references are of record in the file of this patent:

UNITED STATES PATENTS

| Number | Name | Date |
|---|---|---|
| 2,364,408 | Wallace | Dec. 5, 1944 |
| 2,382,508 | Seaver et al. | Aug. 14, 1945 |
| 2,386,967 | Mancini | Oct. 16, 1945 |

FOREIGN PATENTS

| Number | Country | Date |
|---|---|---|
| 547,586 | Great Britain | Sept. 2, 1942 |
| 570,332 | Great Britain | July 3, 1945 |